United States Patent [19]

Mackey

[11] Patent Number: 4,815,034

[45] Date of Patent: Mar. 21, 1989

[54] DYNAMIC MEMORY ADDRESS SYSTEM FOR I/O DEVICES

[76] Inventor: Timothy I. Mackey, 807 N. Orange Dr., Los Angeles, Calif. 90038

[21] Appl. No.: 245,145

[22] Filed: Mar. 18, 1981

[51] Int. Cl.[4] ................................................. G06F 9/00
[52] U.S. Cl. ................................................. 364/900
[58] Field of Search ... 364/200 MS File, 900 MS File

[56] References Cited

U.S. PATENT DOCUMENTS

| | | | |
|---|---|---|---|
| 3,283,308 | 11/1966 | Klein et al. | 364/200 |
| 3,699,532 | 10/1972 | Schaffer et al. | 364/200 |
| 3,975,714 | 8/1976 | Weber et al. | 364/200 |
| 4,086,659 | 4/1978 | Cizmic et al. | 364/900 |
| 4,103,766 | 8/1978 | Ruble et al. | 364/900 X |
| 4,321,665 | 3/1982 | Shen et al. | 364/200 |

OTHER PUBLICATIONS

Motorola Microprocessors, 1981, pp. 3-455, Motorola Inc.

Primary Examiner—Thomas M. Heckler
Assistant Examiner—John G. Mills
Attorney, Agent, or Firm—Ralf H. Siegemund

[57] ABSTRACT

Individual pieces of digital equipment such as I/O units are provided each with a connect circuit which includes a ROM containing an otherwise incomplete but device-specific, dedicated service program; and each such program portion completes a likewise incomplete program contained in a processor so that this processor can serve as a time-shared controller for each I/O unit. The system includes a common bus, and particular features relate to process inclusion of all ROM's in a common memory continuum.

14 Claims, 2 Drawing Sheets

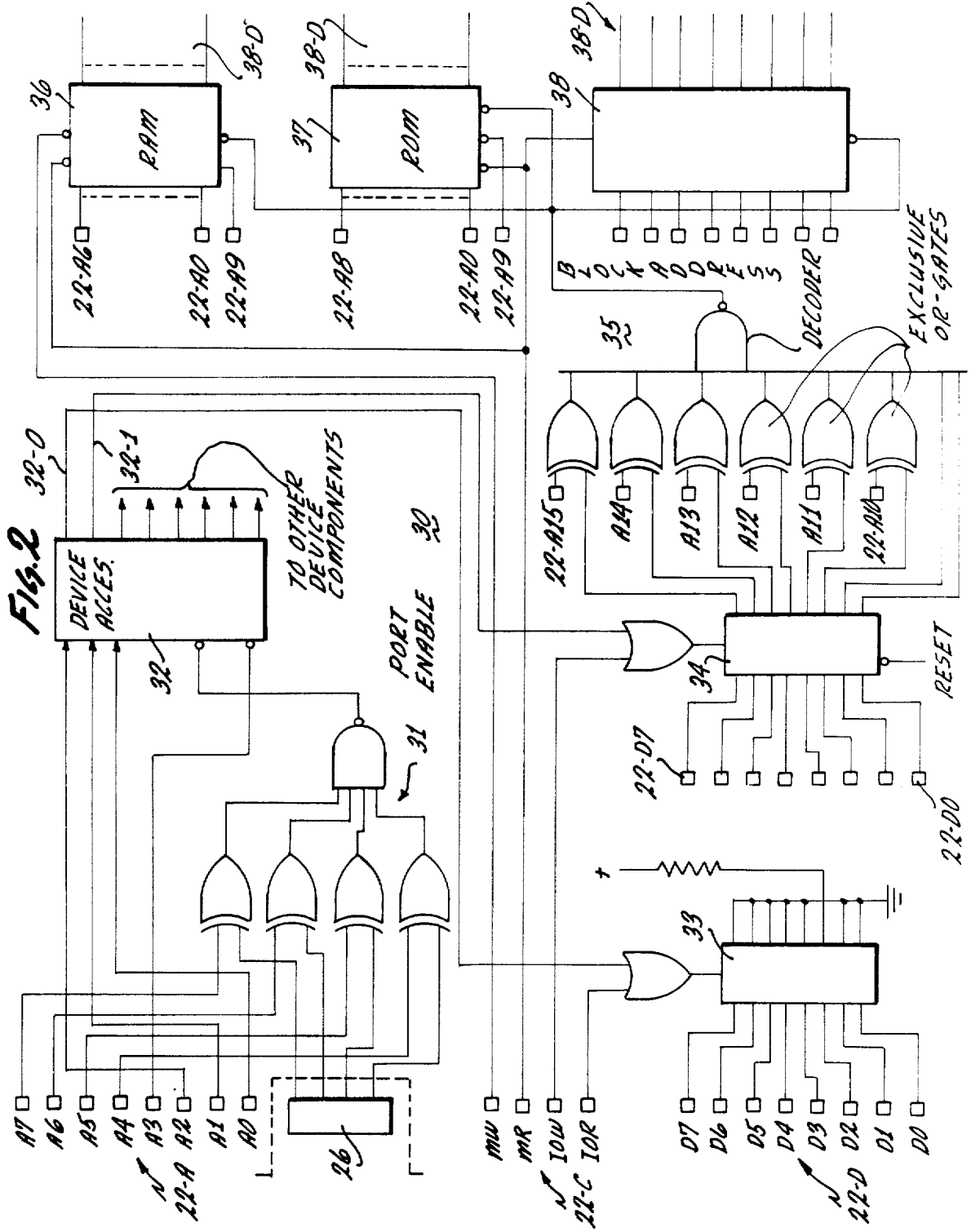

DYNAMIC MEMORY ADDRESS SYSTEM FOR I/O DEVICES

BACKGROUND OF THE INVENTION

The present invention relates to input/output systems and their cooperation with digital processing facilities.

A computer system generally includes a plurality of input and output equipment pieces by means of which the computer proper (mainframe) communicates with the "outside world." Included in this input/output system are also various storage facilities, serving as less expensive memory extensions. Early computers as well as simple versions for minicomputers and microcomputers have the input and output devices incorporated in the computer structure; i.e., the processing facility (CPU, ALU, and so forth) services these I/O units or devices on a time-sharing basis. In other words, the processing facility operates only partially as a computer and must, at times, function as a controller for the data flow to and from the I/O system. It is also a practice of long standing to separate these functions and to provide separate controllers for the I/O units operating in parallel, possibly with each other and with the computer proper, freeing the latter from the time-consuming data transfer task. In essence then, even a relatively small system today executes several programs in as many different processing facilities processed by the system, which aspect has nothing to do with multiprogramming, but merely involves an independent execution of a data processing program and of programs directing the data flow between components of the system other than the data flow between the main memory proper and the principal CPU. Executing such different programs concurrently is obviously the more important, the more I/O equipment is included in the system. However, it will become apparent that the invention is applicable to either kind of systems, i.e., to any computer system, with or without separate I/O service program execution.

The current method of interfacing I/O devices to computers is to design a special controller and special interface structure that fits the bus structure of that particular computer. Since there are many computer systems and many different kinds of I/O devices, even many different versions of I/O devices of the same type (e.g., Keyboard, CRT display, disk files, and so forth), a very (needlessly) large variety of interface structures has to be provided for. The situation is compounded for those types of input and/or output equipment which are of special design because of special, customized purposes.

Some kind of standardization has occurred in that the various controllers for I/O units are in some instances provided with common-type interfaces. Also, standardized interface structures have been designed to permit the interface bus of the controller—I/O unit subsystem to interface with the host computer. Nevertheless, there is a need for structures which permit I/O system interfacing in a manner which is, on the one hand, sufficiently universal and does not, on the other hand, depend upon the (unrealistic) existence of but one standardized and exclusively industry-wide used interface for each and all computers.

Another problem occurs within the I/O controllers. Such a controller usually includes programmable microprocessors This means that software must be generated for each type of I/O devices and for each type of host computers. Add to that the foregoing, largely incomplete interface standardization, and it will be apparent that inspite of widely attempted generalization (for economic reasons), the entire field of input/output equipment is still diversified to a large and, therefore, costly extent.

DESCRIPTION OF THE INVENTION

It is an object of the present invention to provide a new and improved I/O system's organization for and in digital computer systems.

It is a particular object of the present invention to improve digital processing systems which include processing, preferably microprocessing facilities, RAM and ROM memory devices, individual pieces (at least one) of input - output equipment, and a signal bus structure linking such components.

In accordance with the preferred embodiment of the present invention, it is suggested to provide a basic system that includes a microprocessor and RAM and ROM memory devices which contain an incomplete program in the sense that only those program portions are contained in that basic memory device which is common to more than one type of input/output equipment; these memory devices and the microprocessor are interconnected by a common bus, and each input/output unit to be connected to that bus is provided with a supplemental RAM-ROM memory portion, containing a portion of a program which, together with the program contained in the basic memory unit, constitutes a complete program in the sense that the microprocessor together with the basic RAM/ROM memory and the supplemental RAM/ROM memory establish a device-specific controller. Different peripheral equipment pieces each have analogously supplemental RAM/ROM memories, containing also device-specific program portions which likewise complete programs with the (same) basic microprocessor-memory structure such that plural time-sharing controllers are completed in that fashion, each including the same basic, nondevice-specific program, and but a single processor. The bus is preferably constructed for standardized interfacing with a standardized interface that is applicable to all computer systems.

Without intending to limit myself, it is suggested here to use that kind of interface standard which has been developed for the transfer of serialized data bytes each as ASCII characters; practically all of the computers have that capability and have interface structures (or at least, the manufacturer makes it available as an option) in accordance with that standard for permitting the transfer of ASCII characters. It is, however, apparent that other types of interface formats can be employed, even nonstandardized interfaces, without departing from the organizational scheme outlined above.

The inventive system is primarily designed for permitting operation within a common address continuum. Each supplemental RAM/ROM has its own address continuum, and these continua overlap or are even identical for similar as well as different types of I/O units supplemented as per the invention. Each peripheral unit, thus, includes a destination register or registers for receiving a block code or codes from the basic unit, thereby including the units in an unambiguous fashion in a common memory address continuum. For operational access other than memory addressing, the basic unit accesses ports and intra-unit devices. This means that any peripheral unit can be plugged into any port and change its port access code therewith.

The inventive system is applicable as an I/O system for connecting to a host computer. However, the processor and basic memory may actually be constructed and used as a stand-alone unit, preferably in conjunction with hard-wired (ROM) programs, permitting direct programming in higher-level languages.

The inventive system is actually applicable for data transfer in the general sense, serving as a source and/or destination of data, and being possibly in communication with a similarly constructed system. The inventive system may, in particular, involve, include, or even consist of, individual units whose outputs and/or inputs are on some basis multiplexed with each other, for communication with one or more compatible units outside its system.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 2 is a block diagram of a detail of the system's optional modules, shown in FIG. 1, showing particularly supplemented circuitry for the peripheral, or other, units of that system.

Figure 1:
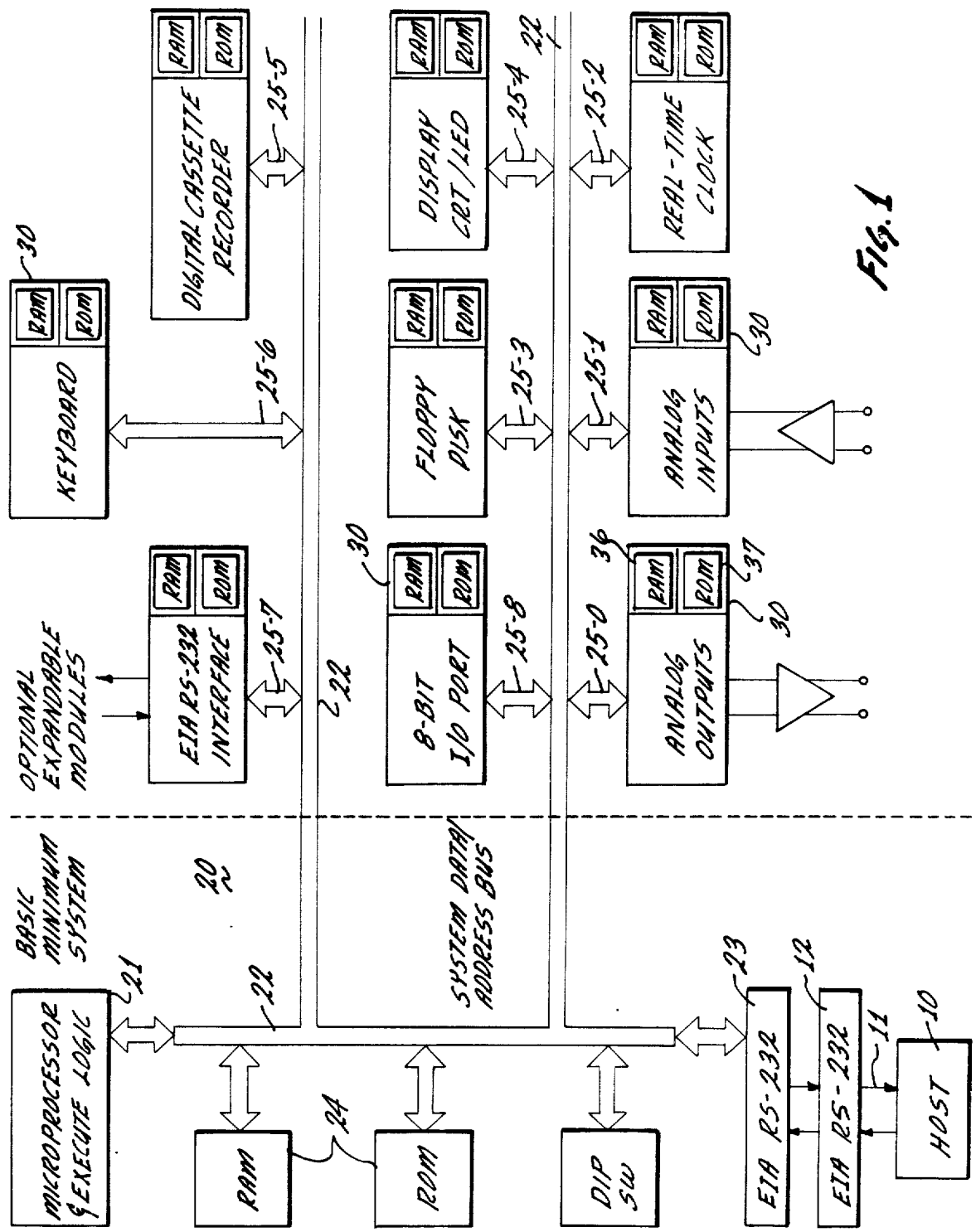
FIG. 1 is a block and system's diagram, illustrating an example of the preferred embodiment of the invention for practicing the best mode thereof.

Proceeding now to the detailed description of the drawings, the diagram and schematic of FIG. 1 includes a computer 10 of basically any design, and having an input/output bus 11. This host computer 10 may have connections to input/output equipments other than those illustrated, which is not important but entirely up to the user. This involves, in particular, I/O components with controllers, and so forth, as they may have been particularly designed for this host computer, and may already be in existence and installed, in which case the inventive system may serve as an extension. Also, the configuration of that bus structure and the possibility of more than one bus structure in and as a part of the computer 10 is of no concern. The only requirement the bus (or one of the buses of computer 10) must meet is that it must be connected to a standardized interface, such as, e.g., RS-232.

This interface is of a special nature, but it is in common use today for the transfer of serialized data bytes such as ASCII characters; all versatile computer systems today must have that capability. Other types of interfaces may be substituted, such as the so-called parallel Q-bus, an IEEE-488 interface, or the like.

The requirement can be restated in that computer 10, through a bus such as bus 11, must be capable of communicating with the "outside world", for example, by means of ASCII characters. This is the presently most commonly used, generalized format for character communication. In the future, a different set, format, and/or interface may come into being; but it will be readily understood that the invention is applicable also in such a case. The requirement being, generalized, the ability of the computer to issue and to receive standardized characters and the existence of a generallized interface for that purpose. For the present, ASCII and RS-232 meet this requirement. This, then, points already to an important aspect of the inventive system: namely, that all input/output operations of the inventive system are based upon such a standardized format, irrespective of the device involved.

The inventive I/O system is now comprised of a basic subsystem 20 which includes a bus 22 and a matching interface 23, being, accordingly, of the RS-232 variety. Aside from bus 22 and interface 23, the basic subsystem 20 includes a processor 21, such as a CPU microprocessor chip Z80 as described in the MOSTEK Z80 Microcomputer Data Book, 1981, which functions as the shared center of a controller that controls all peripheral units of the system. DIP switches may be provided for a direct, manual input.

Bus 22 is, for example, composed of a 16-bit address bus 22-A, an 8-bit data bus 22-D, and several control lines which collectively could be termed as control bus 22-C. This control bus includes a memory-read line and a memory-write line; signals thereon accompany signals on the 22-A bus for a memory access operation. The control bus includes also an I/O write line and an I/O read line; signals thereon accompany data on the data bus 22-D, identifying therewith whether data issue from the microprocessor or are accepted by it.

The central subsystem 20 includes, additionally, RAM and ROM memory units 24. The memory units 24 include the operating system of the overall system to the extent that it is not device specific. In other words, the program that is included in memory structure 24 is merely provided in order to control the data flow between the RAM of 24, the microprocessor, and the interface 23. In that respect, the program contained in memory 24 is complete. However, there is comparatively little data flow between subsystem 20 per se and the host computer 10, except for initialization and set-up procedures upon power-on. Also, any commands that issue from the host computer and are not, or not yet, directed toward a specific device or require specific preparation of such a device, will be handled by the processor in conjunction with its memory 24. Also included in memory 24 are those portions of the program by means of which the periheral system is prepared as will be described in detail below and involving particular access procedures on bus 22, independently from any and all devices (to be described) that are connected to the bus. The program so included is by its very nature incomplete since it does not take into account any and all particulars and specifics of peripheral units. The peripheral equipments include a number of units. The program in memory 24 does not include routines for effecting the transfer of data between any of these peripheral equipment pieces and the host, or among themselves. Likewise missing are program specifics for operating, setting up, and controlling the peripheral equipment subsystem.

The extent and degree of incompleteness of the program that is included in memory 24 is somewhat arbitrary, as will become more apparent below. As a general rule, the program portion should be as extensive as possible and should include all those portions of the operating system which are not device specific.

The basic peripheral subsystem includes additionally a number of ports, of which nine are shown, i.e., 25-0 through 25-8. These ports are, generally, provided for the plug-in of peripheral units. The ports are all identical, except for port identification, and pertain to bus 22.

Aside from physical connections (e.g., plugs) for the bus lines, each port is identified by a circuit, providing, for example, a 4-bit code, this being a portion of the access port code. This 4-bit code setting becomes effective inside the peripheral equipment unit upon being plugged into that port and in a manner to be explained in detail below.

The figure shows representatively nine different input and/or output devices or units as being connected to the nine ports. The illustrated combination of these units is completely arbitrary and serves merely for demonstrating the versatility of the system. In this assumed case, the I/O system includes two on-line, real-time-operated measuring devices (e.g., thermal transducers, flow meters, magnetic field measuring devices, stress meters, and so forth), feeding amplifiers which, in turn, are connected to analog-to-digital converters. This being, in fact, the unit device operating in each instance autonomously in respect to the acquisition of analog data from the "outside world." Other I/O unit devices are: a real-time clock, a floppy disk file, a CRT display as an output device, a digital cassette recorder, a keyboard as an input device, and another interface RS-232, to which one can connect a system of the same type that is illustrated. Thus, the system of the present invention is amenable to cascaded expansion.

Each one of these I/O unit devices is of a conventional design. Broadly speaking, not even a particular data format is required in principle because the I/O device as such will not be connected (or does not have to be connected) directly to the 8-bit data bus 22-D. Rather, each I/O unit is supplemented by a particular circuit 30 for the purpose of allowing the rpocessor 21 to control the respective I/O device. Circuit 30 is connected to one of the ports and has, in fact, a plurality of connect and assignment functions which will be developed below. Circuit 30 includes also a memory being comprised of a RAM portion 36 as well as a ROM portion 37. A portion of the RAM portion is provided for the purpose of temporarily storing data; in other words, a part of the RAM serves, or may serve, as a buffer, possibly obviating the need for buffering by and in the device itself.

From a broader point of view, however, the RAM/ROM portion in each I/O unit constitutes a memory supplement, by means of which memory 24 is supplemented so that, thereby, the unit becomes and is made into a device-specific controller for the particular unit. In particular, the content of ROM 37 holds routines which are prepared specifically for execution by microprocessor 21 in order to obtain the requisite data transfer from and to the particular device, and to transmit to the device properly timed control signals for obtaining specific operations therein.

It should be emphasized that the execution logic (command recognition, decoding, and so forth) is and remains part of the basic unit 20, and of processor 21 in particular. The various memory supplements 36 and 37 merely contain the device-specific program portions to be called upon pursuant to execution of a device-specific routine. That routine is called upon by the overall program (still as supplemented) when service, generally of the particular I/O unit, is required, ultimately as determined by the host equipment.

The device-specific memories 36 and 37 are connected for this supplementing purpose to bus 22, just as memory 24 is; the immediate program execution is carried out by and in processor 21, whereby, usually, the execution will result in particular signals sent by the execution logic of processor 21 into the bus for receiving and further usage by the respective device.

It can readily be seen that the division of the programs into a general portion and device-specific portion is somewhat arbitrary in principle; conceivably, a device-specific portion may include portions that could be included in the general portion. This, then, merely provides some redundancy since that general portion must be included in all of the device-specific programs. On the other hand, the memory 24 may, conceivably, contain subroutines which are, for example, shared by different (but not all) devices.

Another aspect is the following. The inclusion of a RAM portion (36) in the supplemental memory of a unit connection circuit 30 for an I/O unit is also optional because, by its nature, the RAM is empty. Thus, without departing from the main aspect of the invention, the RAM portion in main memory 24 may have a portion set aside to serve as data buffer and/or other variable content memory section for the various devices. However, the size of that section may either be unnecessarily large for some cases or poses a limit on the extent of the peripheral system. Thus, at least some RAM space should be included in the supplemental unit memory, particularly for those peripheral or I/O units which may require a relatively large buffer and variable content memory space, such as a CRT whose data input consists usually of a large amount of variable data to be held in readiness for an unspecified or unspecifiable period of time. In other instances, particularly where the data rate within a peripheral or I/O unit is significantly different from the data transmission rate, e.g., to or from the host, or to or from another piece of peripheral equipment, extensive local buffering may be desirable, for purposes of receiving a large quantity of data and holding it. In all of these cases, a local RAM may be desirable. In other instances, where only a few random access locations are needed, the RAM portion of memory 24 may have space available. Thus, in the general case, some connection circuits 30 will have random access memory facilities 36, while others may not; and for these, a certain storage space is available in the RAM portion of memory 24. All connection units, however, hold a RAM portion 37 for unit- and device-specific program portions.

Since the supplemental memory portions 36 and 37 in each unit are to cooperate with the base memory (24), but are disconnectable therefrom, care must be taken to integrate the access to these supplemental memory portions into the memory access system as a whole. It must be observed here that these supplemental portions of the various I/O units are independent from each other. In the case of similar units, such as analog-to-digital converters, they are, in fact, identical. This means that they all have overlapping or even concurring memory addresses. These addresses are not (yet) tied in with the address continuum of the base memory.

It is, therefore, necessary to operate the peripheral system within a memory continuum that is expanded as far as each I/O unit is concerned and does not overlap in respect to each and all I/O units. It is, therefore, not sufficient to merely plug a peripheral unit into one of the ports. Rather, the connection must include (or trigger) an assignment of the (limited) address continuum of the I/O unit to a block-like location of and within a larger address continuum of the memory system as a whole.

It was mentioned above that the basic system 20 does not access peripheral units as such, but ports only. This aspect must now be supplemented in that, in addition, the microprocessor can also access individual memory locations of the several I/O or peripheral units within an expanded memory address continuum. This expansion is the result of a register (34, in FIG. 2) included in the connect logic and circuit 30 in each I/O unit, which receives from the processor a block address code. This block address will be concatenated to the address continuum of the system and constitutes a high-order block code. This block code is, of course, different for each of the peripheral devices so that all of their memory locations are now rendered individually accessible within a common access scheme. Moreover, the block code may be differently long for different peripheral units; in other words, a fixed size for each and all blocks in the memory continuum as a whole is not required.

Each type of peripheral unit may have a differently large supplemental memory, depending basically upon the complexity of its input and/or output function. It is envisioned that the total ROM/RAM space needed will be at least 1K ($=2^{10}$), but not more than 24K, requiring 15 bits. Since a total of 16 address bits has to be accommodated, the block address can vary from one to six bits. In order to accommodate the system on this aspect, each peripheral unit holds a permanently set register (33, in FIG. 2), whose content specifies the size of its memory. This way, the operating system of the basic microprocessor unit can allocate the correct length of the block number to each unit.

Proceeding now to particulars of the port and connect logic for any of the peripheral units, reference is made to FIG. 2. The circuit illustrated therein illustrates in greater detail bus 22, As stated earlier, this bus has an address portion 22-A with sixteen address lines, 22-AO to 22-A15; a data portion 22-D with eight data lines, 22-DO to 22-D7; and a control portion 22-C, having a plurality of lines, of which only four are shown. These control lines include, in particular, a memory-read line 22-CMR, a memory-write line 22-CMW, an input/output read line 22-C10R, an input/output write line 22-C10W. The first two lines accompany memory requests, the last two lines signal data transfer on the data bus for purposes other than transfer to or from any portion of the memory of the entire system.

Any specific port includes a hard-wired port access code source 26. This source could be a part of the bus/-port system, in which case the code itself is hard-wired in and becomes as such a permanent unambiquous fixture of the bus system. The code will be a multi-bit code. Presently, a 4-bit code is suggested, permitting up to sixteen different I/O units to be connected to a like number of ports or busses. Alternatively, the access code source 26 may be part of connect circuit 30, in which case it must include adjustable switches so that each connect circuit 30 (and the respective I/O unit and device with which it is associated) will receive its own unique access code. This setting is part of the initial setup and generally will not be changed subsequently (though it could). A peripheral or I/O unit having, or being plugged into, that source receives therewith the particular code as its access code. Port code unit 26 is connected to (e.g., plugged into) a gate network 31, being a part of the device-and-unit-connect circuit 30. It includes four exclusive-OR gates whose outputs are AND-ed together. The respective second inputs of the exclusive OR-gates are also connected to four address bus lines, e.g., lines 22-A4, 22-A5, and 22-A6, and 22-A7, as illustrated.

The output of gating network 31 is an I/I port and unit-enabling and accessing signal. Accessing a port, and therewith to an I/O device within the peripheral unit connected to the port by this particular connect circuit 30, is carried out through the address bus. If not accompanied by a memory access request on control bus 22-C, the data on the address bus are not memory addresses. Only the four bits on the four lines 22-A4, 22-A5, 22-A6, and 22-A7 are neded for this I/O port access operation. Signals on other lines of the bus 22-A can be used for direct operational device control.

In the case of an I/O port and unit access as presently described, additional address bits, i.e. A0, A1, and A2, define a particular component within the unit. A decoding circuit 32 provides one-out-of eight port I/O enabling signals. For example, in the case of a disk file, one such signal may be used in order to cause the movable arm (holding the transducer) to move, e.g., by one step. Another such device control signal may turn a device circuit on, and so forth.

The bit positions on bus line 22-A3 of this low-order address byte are used for additional information and can be used by the programmer to specify further operational details, such as moving the transducer arm in a disk file in one direction or in the opposite direction, or start the cassette recorder motor in the reverse instead of forward, and so forth. Conceivably, this line 22-A3 is also available as an additional device-and-component-accessing bit. Typically then, the execution of a device-specific instruction by processor 21 may result in a port I/O address (A4 to A7) accessing this unit and being accompanied by control codes (additional address information) in A0 to A3 to perform the requisite operation in the device.

Independently from access to an I/O device and component, or the like, as thus provided through a low-order address byte (A0 to A7), not being accompanied by a memory request, the circuit portion to be described next is provided in order to incorporate the memory supplement of this unit into the total memory of the basic system. This portion constitutes the main feature of the inventive system.

The supplemental memory is comprised of an optional RAM portion 36 and a required ROM portion 37, having their address signal inputs connected to lines of the address bus 22-A and, respectively, to the memory write and read lines of the control bus (22-CMW and 22-CMR). The data lines of RAM 36 and ROM 37 are connected to a device-internal data bus 38-D. This internal bus is further connected to digital devices of the I/O unit (e.g., the magnetic transducer drive circuitry, the output of an analog-to-digital converter, the drive-and-control circuit of the CRT tube, and so forth). This part of the operation is not of further interest. Moreover, it can readily be seen that a specific peripheral device may have a different format, such as a simple serial data line, a four-line bus, sixteen lines, and so forth. The 8-bit data bus 38-D, presently considered, is connected to a bidirectional buffer register 38, having a second set of input and output lines connected to data bus 22-D of the peripheral system.

Each of these components 36, 37, and 38 requires an enabling signal, called a "Block Address," and that enabling signal is developed for purposes of incorporating the supplemental memories 36 and 37 into the address continuum of the entire system. This incorporation is carried out stepwise, to be described next.

A register 33 with n bits (i.e., 8 bits) in-parallel-input lines has its output connected to the data bus 22-D. The content of this register 33 is preset and defines the total capacity of the supplemental memories 36 and 37 of this peripheral unit. This register is one of the devices that can be accessed during a port access. It will be accessed when the low-order address byte (not being a memory request) includes bits in the A1, A2, and A3 portions which, upon being decoded, cause access device 32 to enable output 32-0. In addition, the control portion 22-C-IOR of the bus must be enable to signal that the microprocessor 21 now reads the content of register 33 as applied to the data bus 22-D.

As stated above, the information contained in register 33 determines the desired allocation of the memory size to this peripheral unit, and is now applied to the data bus 22-D by the operating system (OS) of the basic system 20 so that the supplemental memory (36, 37) of the particular I/O unit can be properly incorporated in the memory as a whole.

Such an access by the microprocessor is carried out as an intialization operation following power-on. The OS of the basic system 20 interrogates the various registers 33 of the ports in order to determine all of the supplemental memory sizes in the entire peripheral system and allocate memory address space to each peripheral unit in terms of block addresses of appropriate length.

This block address will not, for the purpose of this initialization process, arrive on the address bus 22-A but on data bus 22-D because the processor 21 furnishes the block address as a preparatory step and not as a memory access step. The block address as so provided to a peripheral unit is, of course, accompanied by a unit-select (port-select) code on the address bus lines 22-A4, 22-A5, 22-A6, and 22-A7, and by a device control code (on lines 22-A0, 22-A1, 22-A2, and 22-A3) now enabling line 32-1 in order to enable register 34. Also, the processor 21 raises the output request line 22-C-IOW. Thus, the block address for future use by this peripheral unit is set into the register 34 of its circuit 30.

Whenever a memory request is subsequently made, the high-order bits A10 through A15 will be decoded on the output side of register 34 by means of a network 35 which compares any high-order address bits with the content of register 34. It should be noted that such a memory access is not accompanied by a port select. Thus, any 16-bit memory address is applied to all peripheral or I/O units, but only the one whose block address matches will provide for a memory access in its RAM/ROM system.

The respective decoder (35) output enables the two memory units 36 and 37 as well as the transfer stage and buffer 38. The particular memory location to be accessed in either the ROM or the RAM is defined by the concurring low-order address bits on bus 22-A which are applied to the ROM/RAM units 36 and 37 for internal decoding. The buffer stage 38 connects the device-internal data bus 38-D to the data bus 22-D in order to pass thereto the content of the accessed memory location. It is this operation which actually integrates this supplemental memory into the memory as a whole.

It can readily be seen that the supplemental memory system 36 and 37, as depicted in FIG. 2, taken in conjunction with microprocessor 21, constitutes that portion of the device-specific controller which, for example, directly executes all those instructions and routines by means of which, for intance: (a) the specific device is readied through the execution logic 32, including, for example, the presentation of data (e.g., a digitized measuring result, a character typed in, read from a tape, or a disk, and so forth) for temporary storage in RAM 36; (b) this character is placed into a location of RAM 36, being determined by the program as held in the RAM/ROM system 36/37; (c) such a character is transferred to the data bus 22. This latter routine is contained in ROM 37, but will cooperate with the program held in the basic memory system 24 by means of which the data byte when applied to the data bus 22 can be called for by the host computer. The reverse transfer of information occurs in an analogous fashion.

It will be appeciated that the system as described is basically a slave controller for a host computer. The controller does have full computing capabilities so that it can be supplemented solely through programming and memory expansion into a stand-alone system. For example, one may add ROM's which combine hardware programs for executing respectively Pascal programs, BASIC programs, ADA programs, FORTH programs, and so forth.

Still alternatively, the system may serve as a data source and/or destination for communication with another source/destination system being designed in the same fashion; component 10 can be construed as such a system. Still alternatively, the inventive system may include all sources and destinations so that the system as such constitutes a complete entity by and in itself.

The system as described does not include the capability in which a device calls on the microprocessor for service. However, this capability may readily be included through a conventional interrupt procedure. Aside from such an interrupt capability, it is envisioned that the OS in unit or system 20 interrogates, e.g., cyclically, the various ports by applying sequentially a port address to the address bus.

The invention is not limited to the embodiments described above; but all changes and modifications thereof, not constituting departures from the spirit and scope of the invention, are intended to be included.

I claim:

1. A digital data system provided for recieving and/or issuing data, comprising:
   a processor;
   a bus which includes a data bus, address bus, and control lines connected to the processor;
   a basic memory, including at least one RAM and one ROM connected to said bus and containing an operating system;
   at least two I/O units connected to said bus, respectively constituting a source and/or a destination for data to be set into, transmitted by, and/or received from said data bus; and
   a supplemental memory included in each of the I/O units and including a ROM portion as well as containing device-specific program portions to be executed by the processor so that the processor in conjunction with said basic and supplemental memories functions as a controller for said unit, whereby said bus operatively couples the supplementary memory to the processor so that the processor transmits addresses for accessing the ROM portion containing the device specific program portions, via said bus and receives from the ROM portion as accessed, also via said bus, instructions for execution for purposes of controlling the respective I/O unit including data transfer to or from the unit via the bus.

2. A system as in claim 1, and being connected to a host computer via said bus and said interface.

3. A system as in claim 1, the bus including interface means for connection to a host computer.

4. A system as in claim 1, the supplemental memory including also a RAM portion.

5. In a digital data system which includes a bus, a processor, and a memory, both connected to the bus, the system further including at least one input/output device to be serviced by the processor, the improvement comprising:
the memory storing an incomplete program portion for servicing said input/output device; and
a connection circuit connecting the bus to the device and constituting a portion of the device and including a ROM portion containing a remaining portion of a service program for said device so that said incomplete portion and said remaining portion together constitute a complete service program for said one device, said connection circuit including means for connecting said ROM to said bus, so tha the bus couples the ROM portion to said processor enabling said processor to accesss said service program portion in said ROM portion.

6. A circuit for connection to a bus which includes data lines, memory address lines, and control lines, comprising:
register means connected to the data lines for receiving therefrom and holding a variable block address, further having a plurality of output lines;
first block address decoder means connected to said output lines and to some of said address lines for providing an output when said various address lines hold the block address as stored in said register means;
A ROM which holds portions of a service program for an I/O device and having address inputs connected to others of said address lines and being enabled in response to an output of said first decoder means; and
second decoder means connected to particular lines of the bus to be responsive to an access code and providing an enabling operation for said register means; the register means as connected to said data lines receiving therefrom the block address for storage in the register means pursuant to said enabling operation in response to said access code.

7. An interface circuit for connection to a bus and including a ROM which contains a portion of a service program for an I/O device;
a register means for holding an address portion;
a decoder coupled to an output of said register and further connected to an address portion of the bus for providing to the ROM a ROM-enabling signal upon response by said decoder;
a remainder of the address bus being connected to the ROM for accessing of memory locations therein and for setting the content of an accessed ROM location into a data portion of said bus, including at least one instruction pertaining to said service program; and
circuit means connected to said bus for receiving therefrom instruction execution signals following the setting of said instruction from the ROM into said data bus portion, the instruction execution being used in the operation of said I/O device for purposes of a data transfer across said bus.

8. In a circuit as in claim 5, 6 or 7 and including additional circuit means holding a digital representation of a capacity of said ROM, the content of the circuit means being supplied to said bus in response to particular signals arriving as control signals on said bus.

9. In a circuit as in claim 5, 6, or 7 and including additional register means having one side connected to said ROM for temporarily storing data or buffering from the ROM and having its other side connected to a data portion of said bus.

10. In a circuit as in claim 9 and including an internal bus connected to I/O for the feeding data to, or receiving data from, said internal bus, the internal bus also connecting an output of said ROM to one side of said additional register means, either side of said additional register means being capable of inputting and outputting.

11. A data system including two of the systems as set forth in claim 1 and communicating via an interface interconnecting the respective buses.

12. A system as in claim 1, each of said units including register means connected to the data lines for receiving therefrom and holding a variable block address, further having a plurality of output lines;
the respective ROM in each of said units having address inputs connected to others of said address lines and being enabled in response to an output of said first decoder means; and
an input circuit for the register means in each unit and being connected to the data bus to receive therefrom a block address for storage in the register means pursuant to said enabling operation in response to said access code.

13. A digital data system as in claim 1 where each I/O unit includes register means connected to the data bus for receiving therefrom and holding a variable block address, further having a plurality of output lines;
first block address decoder means connected to said output lines and to some lines of said address bus for providing an output when said various address lines hold the block address as stored in said register means;
said ROM portion holding a portion of a service program for the respective I/O device having address inputs connected to other lines of said address bus and being enabled in response to an output of said first decoder means; and
second decoder means connected to particular lines of one of the buses to be responsive to an access code and providing an enabling operation for said register means; the register means as connected to said data receiving therefrom the block address address for storage in the register means pursuant to said enabling operation in response to said access code.

14. A digital data system as in claim 1 wherein each I/O unit includes:
a register means for holding an address portion;
a decoder coupled to an output of said register and further connected to portion of said address bus for providing to the ROM a ROM-enabling signal upon response by said decodere;
a remainder of the address bus being connected to the ROM for accessing of memory locations therein and for setting the content of an accessed ROM location into said data bus, including at least one instruction pertaining to said service program; and circuit means connected to said bus for receiving therefrom instruction execution signals following the setting of said instruction from the ROM into said data bus, the instruction execution being used in the operation of said I/O device for purposes of a data transfer across said bus.

* * * * *